United States Patent
Kang et al.

(10) Patent No.: US 9,479,229 B2
(45) Date of Patent: Oct. 25, 2016

(54) BACKSCATTERING TYPE RFID COMMUNICATION SYSTEM

(75) Inventors: Yanggi Kang, Suwon-si (KR); Jungsung Park, Hwasung-si (KR); Kwangjin Oh, Suwon-si (KR)

(73) Assignee: IDRO CO., LTD., Suwon-si, Gyeonggi-do (KR)

( * ) Notice: Subject to any disclaimer, the term of this patent is extended or adjusted under 35 U.S.C. 154(b) by 466 days.

(21) Appl. No.: 13/080,057

(22) Filed: Apr. 5, 2011

(65) Prior Publication Data

US 2011/0181397 A1 Jul. 28, 2011

Related U.S. Application Data

(63) Continuation of application No. PCT/KR2010/001857, filed on Mar. 26, 2010.

(30) Foreign Application Priority Data

Mar. 27, 2009 (KR) .................. 10-2009-0026545

(51) Int. Cl.
*H04Q 5/22* (2006.01)
*H04B 5/00* (2006.01)
(Continued)

(52) U.S. Cl.
CPC ......... *H04B 5/0062* (2013.01); *G06K 19/0723* (2013.01); *H04B 5/0031* (2013.01); *H04B 5/0037* (2013.01); *G06K 7/0004* (2013.01); *G06K 19/0728* (2013.01)

(58) Field of Classification Search
CPC ..................... G06K 19/0723; G06K 19/0728; G06K 19/145; G06K 7/0004; G06K 7/0008; G06K 7/10079; G06K 7/1097; H04B 5/0031; H04B 5/0037; H04B 5/0062; H04B 1/40

USPC .................. 340/10.2, 10.33, 10.34
See application file for complete search history.

(56) References Cited

U.S. PATENT DOCUMENTS 5,585,953 A * 12/1996 Zavrel ........................... 398/115
5,946,120 A *  8/1999 Chen ............................ 398/155
(Continued)

FOREIGN PATENT DOCUMENTS

JP      2008-257489 A      10/2008
WO     WO 2007012893 A1 *  2/2007

OTHER PUBLICATIONS

International Search Report mailed Oct. 25, 2010; PCT/KR2010/001857.

*Primary Examiner* — Firmin Backer
*Assistant Examiner* — Adnan Aziz
(74) *Attorney, Agent, or Firm* — Ladas & Parry LLP

(57) ABSTRACT

A backscattering type radio frequency identification (RFID) communication system, and more particularly, a backscattering type RFID communication system in which an RFID tag transmits a signal back to an RF reader by using energy of a carrier wave transmitted by the RFID reader. Provided is a backscattering type radio frequency identification (RFID) communication system RFID communications are performed efficiently without an error while interference between RFID readers does not occur even under an overcrowded reader environment. Interference of RF signals between the RFID readers does not occur, and RFID communications can be efficiently performed even under the overcrowded reader environment. Transmitting and receiving time steps of the RFID readers do not need to be synchronized with one another so that compatibility of the RFID readers can be improved.

10 Claims, 6 Drawing Sheets

(51) Int. Cl.
*G06K 19/07* (2006.01)
*G06K 7/00* (2006.01)

(56) References Cited

U.S. PATENT DOCUMENTS

| | | | |
|---|---|---|---|
| 7,110,678 B2* | 9/2006 | Willebrand et al. | 398/115 |
| 7,652,557 B2* | 1/2010 | Kantrowitz et al. | 340/10.34 |
| 8,205,800 B2* | 6/2012 | Addy | 235/492 |
| 2005/0052279 A1* | 3/2005 | Bridgelall | 340/10.1 |
| 2005/0116813 A1* | 6/2005 | Raskar | 340/10.1 |
| 2005/0212676 A1 | 9/2005 | Steinberg | |
| 2006/0002719 A1* | 1/2006 | Fuse | 398/189 |
| 2006/0145865 A1* | 7/2006 | Forster | G06K 19/0723 340/572.8 |
| 2006/0267772 A1* | 11/2006 | Knadle et al. | 340/572.4 |
| 2007/0096878 A1* | 5/2007 | Yamasaki | 340/10.3 |
| 2007/0176748 A1* | 8/2007 | Salamitou | G06K 19/0724 340/10.1 |
| 2007/0194886 A1* | 8/2007 | Bang et al. | 340/10.1 |
| 2007/0205283 A1 | 9/2007 | Vesikivi et al. | |
| 2008/0009257 A1* | 1/2008 | Safarian | H04B 1/525 455/307 |
| 2008/0106381 A1* | 5/2008 | Adamec | G06K 7/0008 340/10.2 |
| 2008/0150689 A1* | 6/2008 | Chiu | H04B 1/30 340/10.1 |
| 2008/0238679 A1* | 10/2008 | Rofougaran et al. | 340/572.2 |
| 2009/0021374 A1* | 1/2009 | Stagg | G06K 7/0008 340/572.1 |
| 2009/0146791 A1* | 6/2009 | Jantunen et al. | 340/10.2 |
| 2010/0061734 A1* | 3/2010 | Knapp | 398/128 |
| 2010/0127875 A1* | 5/2010 | Wong | G06K 7/0008 340/572.7 |
| 2010/0176939 A1* | 7/2010 | Harres | 340/539.1 |
| 2011/0090060 A1* | 4/2011 | Tavshikar | 340/10.3 |
| 2011/0091216 A1* | 4/2011 | Addy | 398/115 |
| 2011/0304439 A1* | 12/2011 | Panchalan et al. | 340/10.3 |

* cited by examiner

BACKSCATTERING TYPE RFID COMMUNICATION SYSTEM

CROSS-REFERENCE TO RELATED PATENT APPLICATION

This application claims the benefit of Korean Patent Application No. 10-2009-0026545, filed on Mar. 27, 2009, in the Korean Intellectual Property Office, the disclosure of which is incorporated herein in its entirety by reference.

BACKGROUND OF THE INVENTION

1. Field of the Invention

The present invention relates to a backscattering type radio frequency identification (RFID) communication system, and more particularly, to a backscattering type RFID communication system in which an RFID tag transmits a signal back to an RE reader by using energy of a carrier wave transmitted by the RFID reader.

2. Description of the Related Art

A communication system in which a radio frequency identification (RFID) tag transmits a signal to an RFID reader by using energy of a carrier wave transmitted by the RFID reader, is referred to as a backscattering communication system.

Referring to FIG. 1, in a backscattering communication system according to the related art, communications between an RFID reader and an RFID tag are performed in such a way that, when the RFID reader transmits a query signal for a predetermined time step, the RFID tag transmits a response signal back for the next time step.

Generally, a frequency band used in RFID communications is designated at a predetermined range in each country, and approval of an RFID-related product is regulated not to deviate from the frequency range.

Thus, when communications between a plurality of RFID readers and a plurality of RFID tags are performed in a restricted frequency band, the frequency band is divided into a plurality of frequency channels, and each RFID reader transmits and receives an RF signal within the range of a designated frequency channel.

As illustrated in FIG. 2, when a query signal of an RFID reader is transmitted upon a particular frequency channel, an RFID tag transmits back a response signal having a frequency that is the same as or in the proximity of a carrier wave by using backscattering. In FIG. 2, the response signal having a slightly lower or higher frequency than a frequency of the carrier wave is transmitted back within the same frequency channel as that of the carrier wave. Such a case is referred to as in-channel backscattering. Besides, there are boundary channel scattering by which a response signal is transmitted back at a frequency corresponding to a boundary between a frequency channel of a carrier wave and a frequency channel adjacent to the frequency channel of the carrier wave and adjacent-channel scattering by which a response signal is transmitted back at a frequency of a frequency channel adjacent to the frequency channel of the carrier wave.

Meanwhile, an RFID communications environment in which the number of RFID readers used in a frequency band allocated to an RFID communication system is greater than the number of frequency channels, is referred to as an overcrowded reader environment.

Under the overcrowded reader environment, there are problems in performing backscattering type RFID communications as described above. Since the number of RFID readers is greater than the number of frequency channels, each RFID reader transmits a query signal upon a randomly-selected frequency channel for each time step. In this case, as illustrated in FIG. 3, an RFID reader 2 may transmit a carrier wave frequently for a time step in which an RFID tag 1 responds to a query signal of an RFID reader 1.

Due to the overcrowded reader environment, frequency channels of carrier waves transmitted by two or more RFID readers may be the same frequently. When the frequency channels of the RFID reader 1 and the RFID reader 2 are the same, a response signal of an RFID tag 1 and a query signal of the RFID reader 2 overlap each other frequently at the same frequency channel, as illustrated in FIG. 4.

In general, an RFID tag in a backscattering type RFID communication system transmits back only a part of energy of a carrier wave as a response signal. Thus, intensities of response signals 2 and 3 are relatively weak compared to an intensity of a query signal 1, as illustrated in FIG. 4. Thus, the RFID reader 1 cannot receive the response signals 2 and 3 of the RFID tag 1 due to the query signal 1 of the RFID reader 2.

In order to solve these problems, transmitting and receiving time steps of all RFID readers may be synchronized with one another. However, the method causes the structure of the RFID reader to be complicated, and manufacturing costs may be increased. In addition, when RFID readers manufactured by different manufacturers are used under the same environment, it is difficult that the RFID readers have compatibility therebetween.

SUMMARY OF THE INVENTION

The present invention provides a backscattering type radio frequency identification (RFID) communication system in which RFID communications are performed efficiently without an error while interference between RFID readers does not occur even under an overcrowded reader environment.

According to an aspect of the present invention, there is provided a backscattering type radio frequency identification (RFID) communication system including: a plurality of RFID readers, each of the plurality of RFID readers including: a reader controller generating a query signal to be transmitted to an RFID tag; a visible ray transmitting unit transmitting the query signal transmitted by the reader controller in a form of visible rays; a reader transmitter transmitting a carrier wave in a form of RF by selecting one from among a plurality of frequency channels; and a reader receiver receiving a response signal in a form of RF transmitted from the RFID tag and transmitting the response signal to the reader controller; and a plurality of RFID tags, each of the plurality of RFID tags including: a visible ray receiving unit receiving the query signal transmitted by the visible ray transmitting unit of the RFID reader and converting the query signal into an electrical signal; a tag receiver receiving the carrier wave transmitted by the reader transmitter of the RFID reader; a tag controller processing a command of the query signal received by the visible ray receiving unit and generating a response signal with respect to the query signal; and a tag transmitter transmitting the response signal transmitted by the tag controller in a form of an RF carrier signal with respect to the carrier wave by using energy of the carrier wave received by the tag receiver.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

The present invention will now be described more fully with reference to the accompanying drawings in which exemplary embodiments of the invention are shown.

Figure 1:
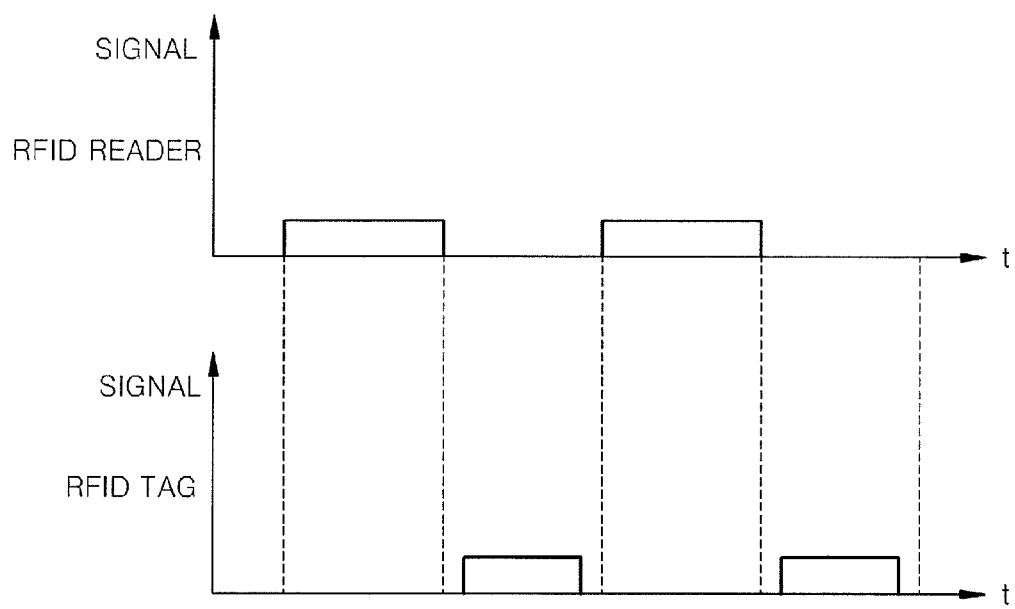
FIGS. 1 through 4 each illustrate a backscattering type radio frequency identification (RFID) communication system according to the related art.
Figure 2:
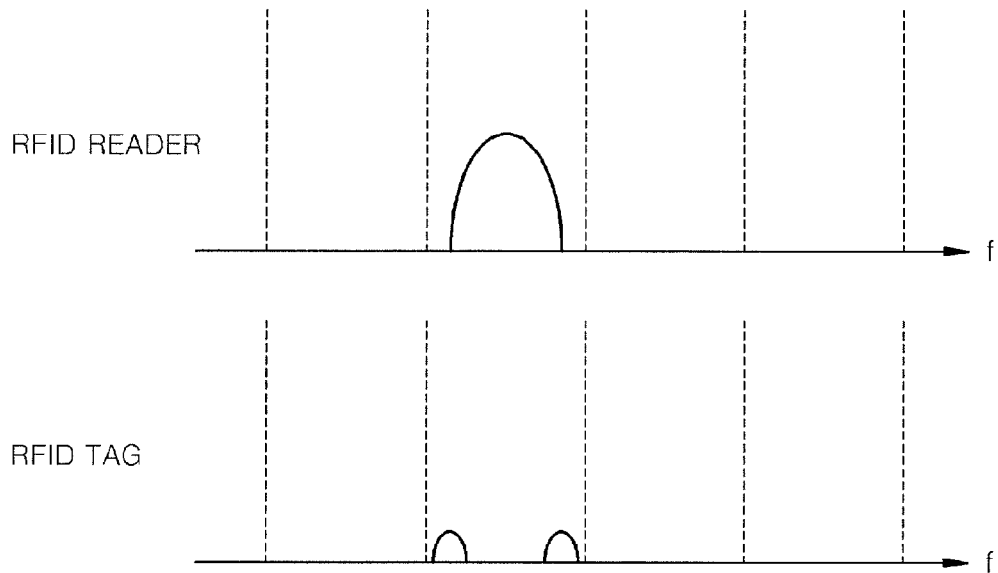
Figure 3:
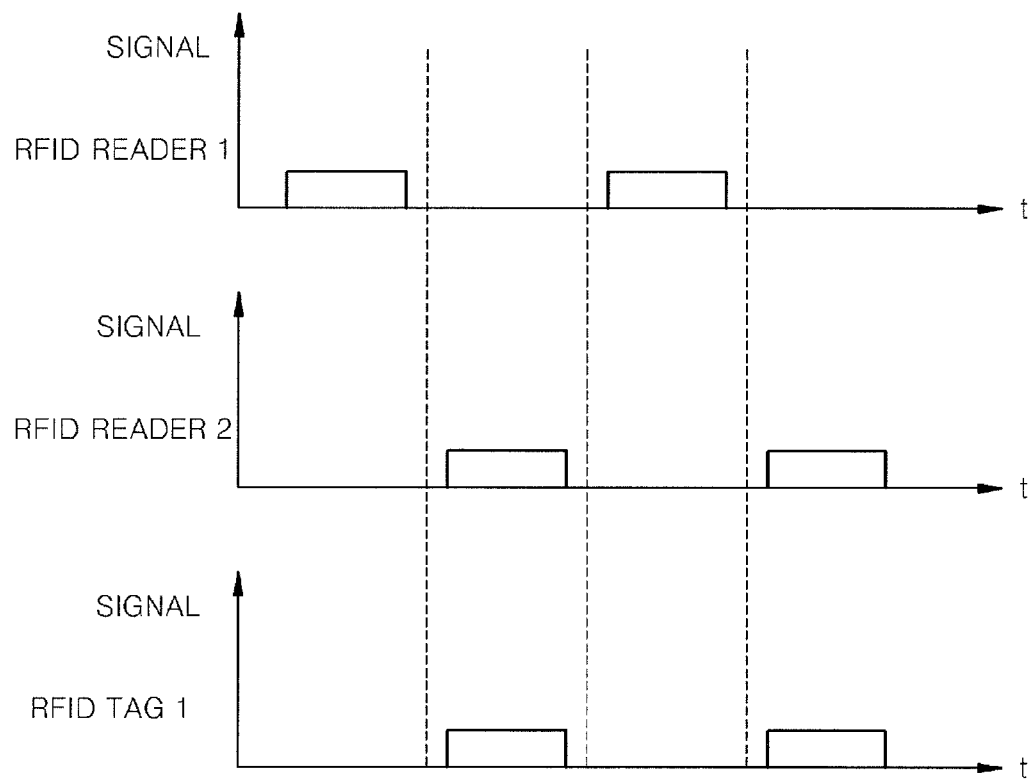
Figure 4:
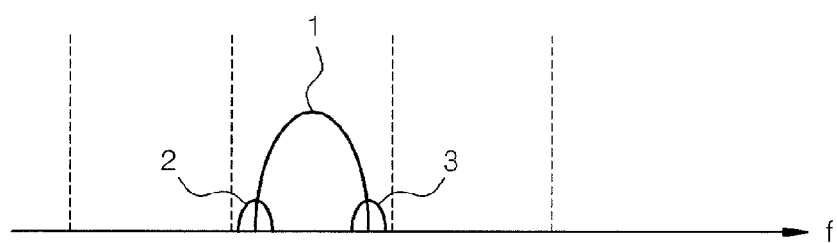
Figure 5:
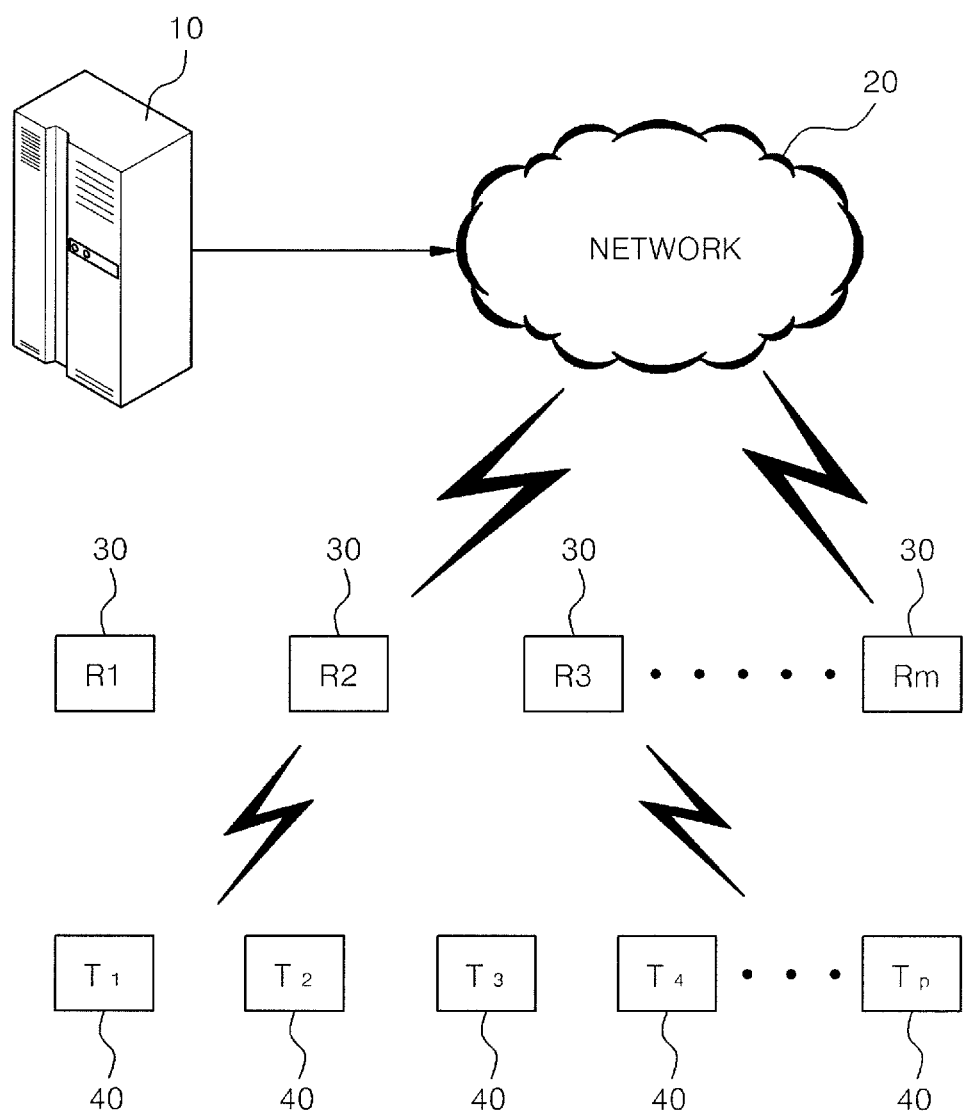
FIG. 5 schematically illustrates a backscattering type RFID communication system according to an embodiment of the present invention.
Figure 6:
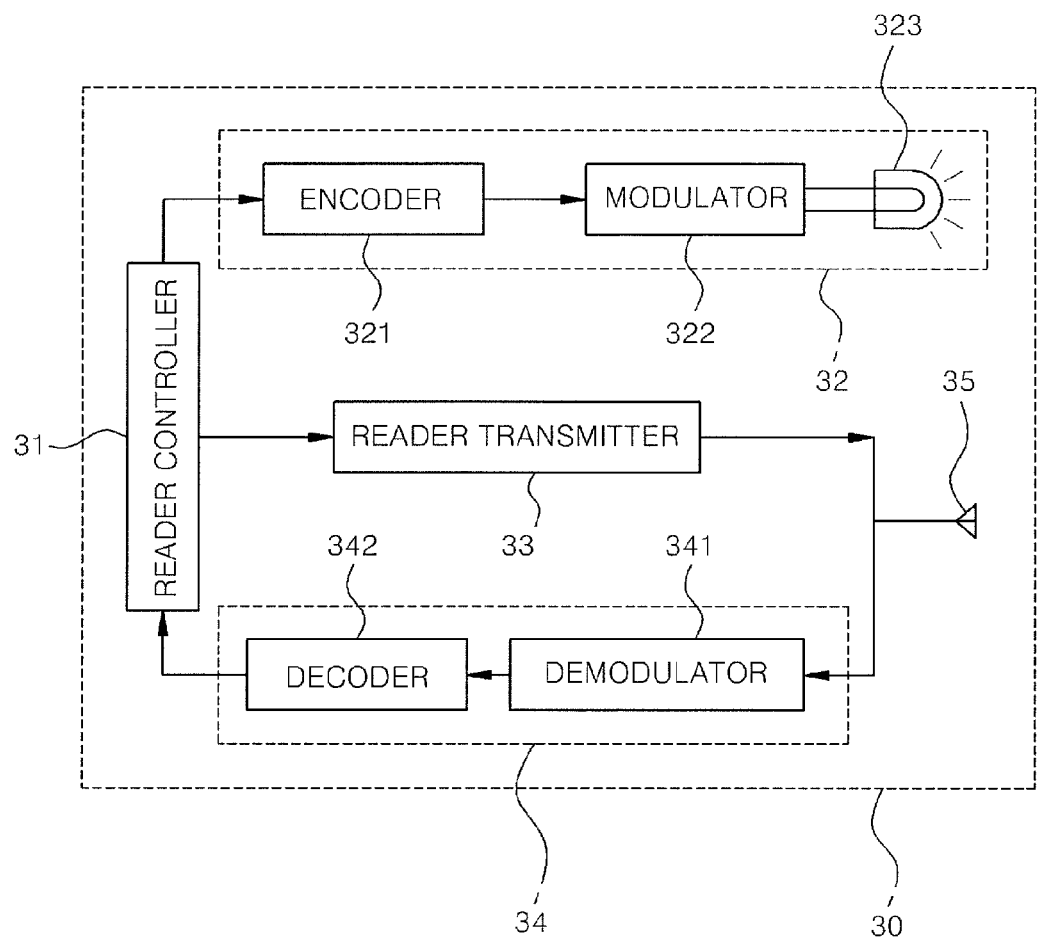
FIG. 6 is a block diagram of an RFID reader of the backscattering type RFID communication system illustrated in FIG. 5.
Figure 7:
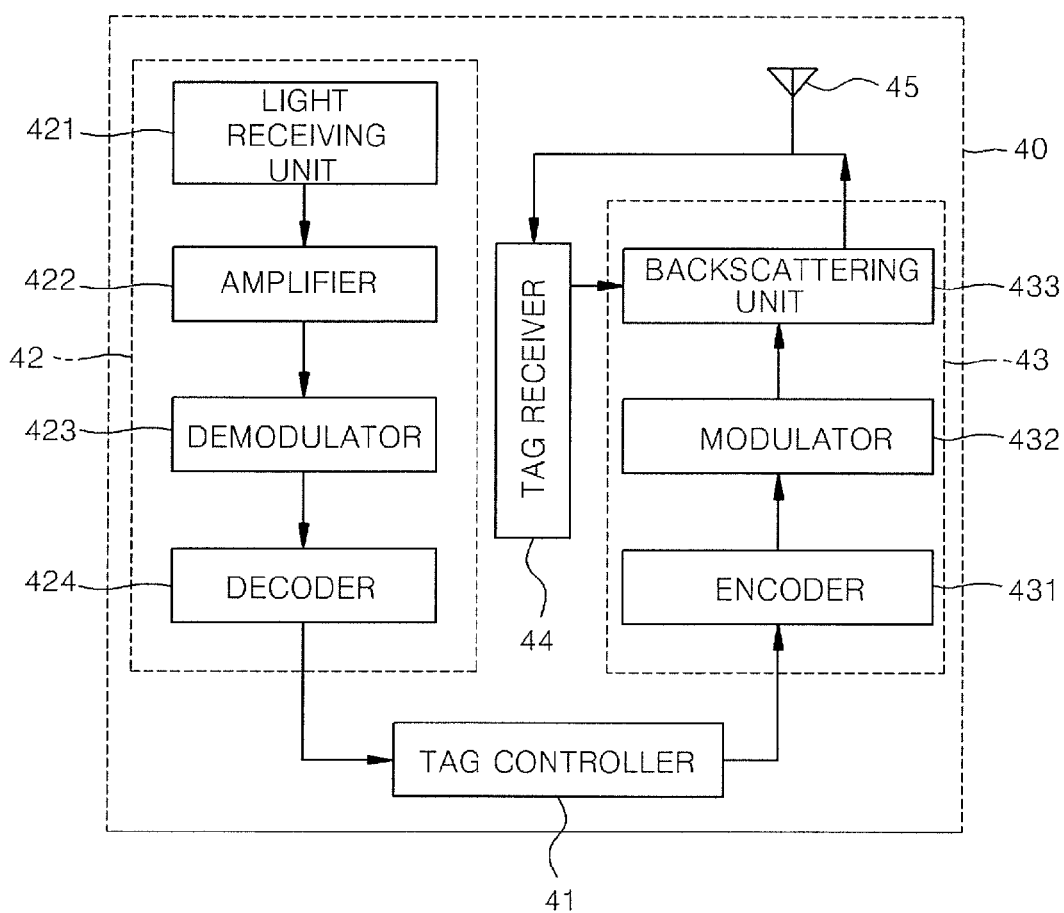
FIG. 7 is a block diagram of an RFID tag of the backscattering type RFID communication system illustrated in FIG. 5.

FIG. 5 schematically illustrates a backscattering type radio frequency identification (RFID) communication system according to an embodiment of the present invention, FIG. 6 is a block diagram of an RFID reader of the backscattering type RFID communication system illustrated in FIG. 5, and FIG. 7 is a block diagram of an RFID tag of the backscattering type RFID communication system illustrated in FIG. 5.

Referring to FIGS. 5 through 7, the backscattering type RFID communication system according to the current embodiment includes a plurality of RFID readers 30 and a plurality of RFID tags 40. FIG. 5 illustrates a case where the backscattering type RFID communication system is configured by m RFID readers 30 and p RFID tags 40.

In the current embodiment, RFID communications between the plurality of RFID readers 30 and the plurality of RFID tags 40 is performed over N frequency channels formed by dividing a frequency band allocated to RFID communications by N.

Each of the RFID readers 30 is connected to a server 10 via a wireless network 20, and wireless communication is performed in such a way that each of the RFID readers 30 and each of the RFID tags 40 transmit and receive a visible ray signal and an RF signal.

Referring to FIG. 6, each RFID reader 30 includes a reader controller 31, a visible ray transmitting unit 32, a reader transmitter 33, and a reader receiver 34.

The reader controller 31 generates a query signal to be transmitted to each RFID tag 40 and transmits the query signal to the visible ray transmitting unit 32.

The visible ray transmitting unit 32 includes an encoder 321, a modulator 322, and an emission unit 323. The encoder 321 encodes the query signal transmitted by the reader controller 31 in accordance with a predetermined rule, and the modulator 322 modules the query signal transmitted by the encoder 321 into a form suitable for transmission as a visible ray signal. In order to modulate the query signal by using the modulator 322, various methods including amplitude shift keying (ASK) and the like may be used. When the ASK method is used, on/off keying (OOK) modulation with a modulation index of 100% may be used to improve signal transmission efficiency. The emission unit 323 converts the query signal in a form of an electrical signal transmitted by the modulator 322 into a form of an optical signal, thereby emitting visible light. The emission unit 323 may be a laser diode (LD), a light emitting diode (LED), or the like. In particular, the LED may perform a function of illumination and a function of a visible ray communication unit simultaneously. Also, the LED does not use mercury components of a fluorescent lamp or an incandescent lamp used as a conventional illumination light source and thus is eco-friendly.

The reader transmitter 33 transmits a carrier wave in a form of RF to each RFID tag 40 via an antenna 35. In this regard, a circulator, a coupler or the like is used to separate transmitting and receiving signals from each other. The reader transmitter 33 transmits a carrier wave having a frequency that belongs to the range of one of N frequency channels. The reader transmitter 33 changes the frequency of the carrier wave at regular intervals. In other words, the reader transmitter 33 changes the frequency of the carrier wave upon one frequency channel randomly selected from the N frequency channels at regular intervals.

In addition, the RFID reader 30 transmits the carrier wave upon the selected frequency channel when the frequency channel is not used by another RFID reader 30 after checking whether the same frequency channel as the frequency channel of the carrier wave to be transmitted is used by another RFID reader 30. This is referred to as listen before transmit (LBT).

The reader receiver 34 receives a response signal in a form of RF in which the carrier wave transmitted by the reader transmitter 33 is transmitted back by the RFID tag 40 and transmits the response signal to the reader controller 31. In this regard, the response signal is received by a circulator, a coupler or the like for separating transmitting and receiving signals from one another. Generally, a part of a carrier wave to be transmitted to supply energy to a tag is received by a reader receiver and disturbs to receive a tag signal and may cause performance degradation. Thus, a signal having a phase difference of 180 degrees with respect to the carrier wave detected by the reader receiver 34 and having the same magnitude as that of the carrier wave is generated from the reader transmitter 33 and is added by the reader receiver 34 so that the carrier wave leaked to the reader receiver 34 is removed and performance of the backscattering type RFID communication system is improved. The reader receiver 34 includes a demodulator 341 and a decoder 342. The demodulator 341 demodulates the response signal received via the antenna 35 into a form suitable for decoding, and the decoder 342 decodes the demodulated response signal into a signal in a form suitable for recognition by the reader controller 31 in which the demodulated response signal can be recognized by the reader controller 31.

Referring to FIG. 7, each RFID tag 40 includes a tag controller 41, a visible ray receiving unit 42, a tag receiver 44, and a tag transmitter 43.

The visible ray receiving unit 42 includes a light receiving unit 421, an amplifier 422, a demodulator 423, and a decoder 424. The light receiving unit 421 detects the query signal in the form of visible rays transmitted by the visible ray transmitting unit 32 of the RFID reader 30 and converts the detected query signal into an electrical signal. The light receiving unit 421 is configured by using a photodetector or the like. The query signal received by the light receiving unit 421 is amplified by the amplifier 422 and is demodulated by the demodulator 423 into a form suitable for decoding. The decoder 424 decodes the query signal transmitted from the demodulator 423 into a form suitable for processing by using the tag controller 41 and is transmitted to the tag controller 41.

The tag controller 41 receives the query signal from the visible ray receiving unit 42, processes a command included in the query signal, generates a response signal with respect to the query signal, and transmits the generated response signal to the tag transmitter 43.

The tag receiver 44 receives the carrier wave transmitted by the reader transmitter 33 of the RFID reader 30 via an antenna 45 and transmits the received carrier wave to the tag transmitter 43.

The tag transmitter 43 includes an encoder 431, a modulator 432, and a backscattering unit 433. The encoder 431 encodes the response signal transmitted by the tag controller 41 and transmits the encoded response signal to the modulator 432, and the modulator 432 modulates the response signal into a form suitable for transmission. The backscattering unit 433 transmits the response signal to the RFID reader 30 via the antenna 45 by loading the response signal on the carrier wave transmitted from the tag receiver 44. In this regard, the backscattering unit 433 transmits the response signal at a frequency of the same frequency channel as the carrier wave received to a manner to be resonant to the carrier wave, a frequency of a frequency channel adjacent to the carrier wave or a frequency corresponding to a boundary between the frequency channel of carrier wave and an adjacent channel.

Hereinafter, a communication method of the backscattering type RFID communication system having the above structure will be described.

The RFID reader 30 generates a query signal by using the reader controller 31 and transmits the query signal to each RFID tag 40 in a form of visible rays by using the visible ray transmitting unit 32. The reader transmitter 33 transmits a carrier wave of a randomly-selected frequency channel to the RFID tag 40 via the antenna 35. In this regard, the reader transmitter 33 transmits the carrier wave having a predetermined frequency before the frequency channel is randomly reset by the reader controller 31. In detail, the RFID reader 30 transmits the query signal containing main data to the RFID tag 40 in the form of visible rays and transmits the carrier wave used as an energy source of a signal transmitted back by the RFID tag 40 by backscattering, in the form of RF to the RFID tag 40.

The RFID tag 40 receives the query signal in a form of visible rays by using the visible ray receiving unit 42 and processes a command according to the query signal by using the tag controller 41. For example, the RFID tag 40 may store data transmitted by the RFID reader 30 in a memory unit of the RFID tag 40 or may update the data, may have access to information of the RFID tag 40 to be inquired by the RFID reader 30 and may transmit the information to the RFID reader 30.

Figure 8:
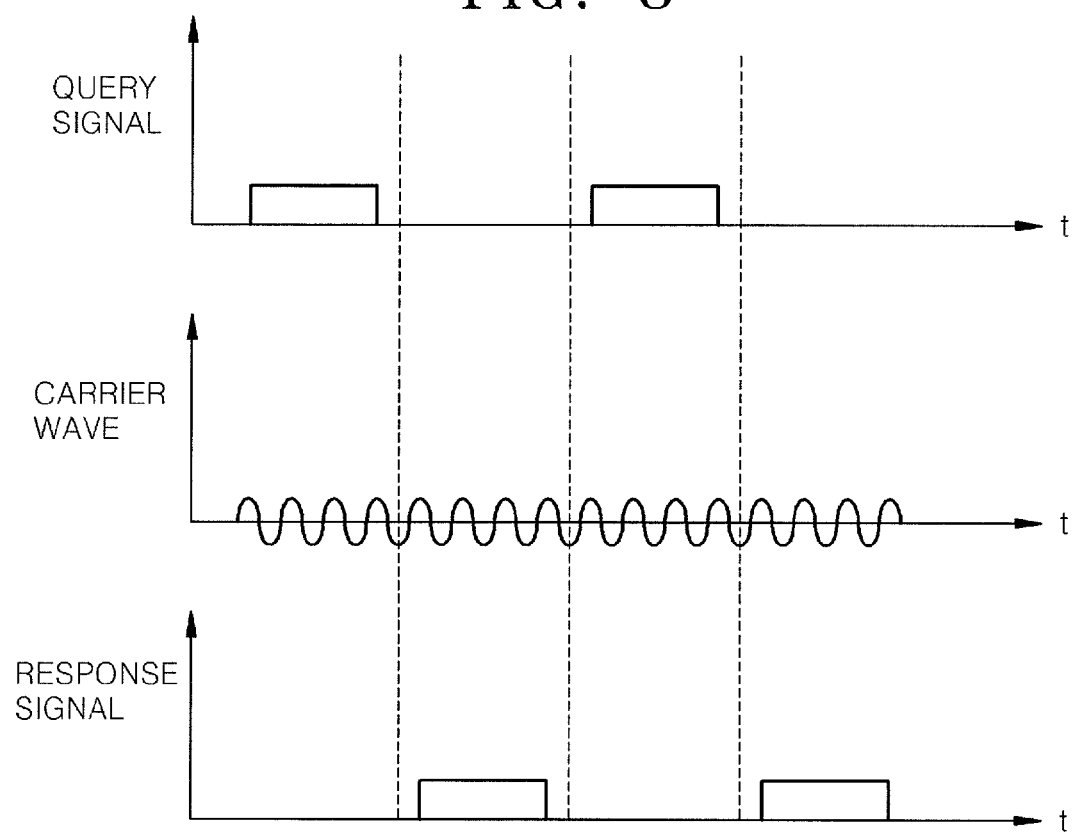
FIGS. 8 and 9 each illustrate an operation of the backscattering type RFID communication system illustrated in FIG. 5.

The response signal is loaded on a carrier signal of the carrier wave and is transmitted to the RFID reader 30 by the RFID tag 40. The carrier wave received by the tag receiver 44 is transmitted to the backscattering unit 433, and the backscattering unit 433 generates a carrier signal that is resonant at the frequency that is the same as or similar to the carrier wave. Also, the backscattering unit 433 transmits the response signal transmitted by the tag controller 41 to the RFID reader 30 by loading the response signal on the carrier signal. In detail, the RFID tag 40 transmits the response signal to be transmitted to the RFID reader 30 by transmitting a resonance frequency signal back by using an energy source of the carrier wave. A change in the query signal, the carrier wave, and the response signal according to time is illustrated in FIG. 8.

The backscattering unit 433 generates a carrier signal having the same frequency as the carrier wave according to an encoding method of the response signal and data speed or generates a carrier signal having a frequency that is slightly lower or higher than the frequency of the carrier wave. As occasion demands, the backscattering unit 433 generates a carrier signal at a frequency in the range of a frequency channel adjacent to the frequency channel of the carrier wave or generates a carrier signal at a frequency that is a boundary between the frequency channel of the carrier wave and a frequency channel adjacent to the frequency channel of the carrier wave.

Figure 9:
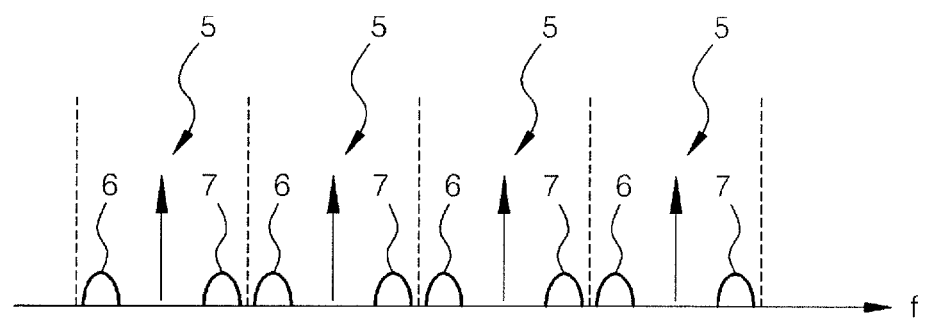

As described above, transmitting and receiving of the query signal and transmitting and receiving of the response signal are performed by dividing visible rays and RF signals. Thus, under an overcrowded reader environment in which the number of RFID readers 30 is greater than the number of frequency channels, communications with the RFID tags 40 may be efficiently performed without interference between the RFID readers 30. In other words, since information does not need to be included in the carrier wave and the carrier wave is used as only an energy source of the backscattering unit 433, a carrier wave 5 may be controlled at a precise frequency having no bandwidth, as illustrated in FIG. 9. In this regard, the carrier wave 5 that belongs to the same frequency channel does not affect response signals 6 and 7, and even though the carrier wave 5 and the response signals 6 and 7 overlap one another, they may be easily separated from one another. Thus, the reader receiver 34 of the RFID reader 30 may receive the response signal efficiently while interference between the carrier wave 5 and the response signals 6 and 7 does not occur even under the overcrowded reader environment.

In addition, since the carrier wave 5 does not affect the response signals 6 and 7, a time step in which the RFID readers 30 receive the carrier wave 5 and a time step in which the response signals 6 and 7 are received, do not need to be synchronized with each other. In other words, the RFID readers 30 do not affect one another even though they transmit the query signal and receive the response signal for different time steps. Thus, the RFID readers 30 may be easily developed and manufactured, and compatibility of the RFID readers 30 may also be improved.

In addition, as described above, each RFID reader 30 transmits the carrier wave upon a selected frequency channel when the frequency channel is not used by another RFID reader 30 after checking whether the same frequency channel as the frequency channel of the carrier wave to be transmitted is used by another RFID reader 30. Thus, communications between the RFID readers 30 and the RFID tags 40 may be smoothly performed while interference between the RFID readers 30 does not occur even under the overcrowded reader environment.

Meanwhile, according to the present invention, the query signal is transmitted using visible rays. Thus, the visible rays generated by the visible ray transmitting unit 32 are irradiated onto a particular RFID tag 40 so that the query signal is transmitted only to a desired RFID tag 40 from among the plurality of RFID tags 40. In addition, unlike the backscattering type RFID communication system according to the related art, the RFID tags 40 that communicate with the RFID readers 30 may be easily checked by the user with naked eyes. Since the query signal in a form of visible rays can be easily intercepted, communications between the RFID readers 30 and the RFID tags 40 may be performed only in a desired region, and an unnecessary RFID signal can be easily prevented from being transmitted to the outside and from affecting the external environment.

In addition, since visible rays are mainly used, propagation authorization is not necessary when the RFID readers 30 and the like are developed.

As described above, although the exemplary embodiment of the present invention has been described with reference to the drawings, the scope of the present invention is not limited to the exemplary embodiment.

For example, the RFID reader 30 transmits the carrier wave when the frequency channel is not used after checking whether the same frequency channel as the carrier wave to be transmitted is used. However, the RFID reader 30 may transmit the carrier wave arbitrarily without previously checking whether the frequency channel is used. In this case, when frequency channels of the carrier wave to be transmitted by two or more RFID readers overlap each other and the RFID readers fail to receive a response signal of an RFID tag, the RFID readers transmit the query signal and the carrier wave again to try communications with the RFID tag.

Furthermore, the RFID tag may be woken up by modulation visible rays or non-modulation visible rays.

According to the present invention, interference of RF signals between RFID readers does not occur, and RFID communication can be efficiently performed even under the overcrowded reader environment.

According to the present invention, transmitting and receiving time steps of the RFID readers do not need to be synchronized with one another so that compatibility of the RFID readers can be improved.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A backscattering type radio frequency (RFID) communication system comprising:
   a plurality of RFID readers, each of the plurality of RFID readers comprising:
   a reader controller generating a query signal to be transmitted to an RFID tag;
   a visible ray transmitting unit transmitting the query signal transmitted by the reader controller in a form of visible rays;
   a reader transmitter continuously transmitting a non-modulated carrier wave of a precise frequency having no bandwidth in a form of RF by selecting one from among a plurality of frequency channels; and
   a reader receiver receiving a response signal in a form of RF transmitted from the RFID tag and transmitting the response signal to the reader controller, wherein transmitting and receiving of the query signal and transmitting and receiving of the response signal are performed by dividing visible rays and RF signals, the number of the RFID readers is greater than the number of frequency channels; and
   a plurality of RFID tags, each of the plurality of RFID tags comprising:
   a visible ray receiving unit receiving the query signal transmitted by the visible ray transmitting unit of the RFID reader and converting the query signal into an electrical signal;
   a tag receiver receiving the non-modulated carrier wave continuously transmitted by the reader transmitter of the RFID reader;
   a tag controller processing a command of the query signal received by the visible ray receiving unit and generating the response signal with respect to the query signal; and
   a tag transmitter transmitting the response signal transmitted by the tag controller in a form of an RF carrier signal with respect to the non-modulated carrier wave by using energy of the non-modulated carrier wave received by the tag receiver.

2. The backscattering type RFID communication system of claim 1, wherein the reader transmitter of the RFID reader changes a frequency of the non-modulated carrier wave into one frequency channel randomly selected from among the plurality of frequency channels at regular intervals.

3. The backscattering type RFID communication system of claim 1, wherein, after checking whether the same frequency channel as a frequency channel of the non-modulated carrier wave to be transmitted is used by another RFID reader, the RFID reader transmits the non-modulated carrier wave upon the frequency channel when the frequency channel is not used by another RFID reader.

4. The backscattering type RFID communication system of claim 3, wherein the tag transmitter of the RFID tag transmits the response signal at a frequency of the same frequency channel as the non-modulated carrier wave received to a manner to be resonant to the carrier wave, a frequency of a frequency channel adjacent to the frequency channel of the non-modulated carrier wave or a frequency corresponding to a boundary between the frequency channel of the non-modulated carrier wave and a frequency channel adjacent to the frequency channel of the carrier wave.

5. The backscattering type RFID communication system of claim 1, wherein the visible ray transmitting unit of the RFID reader comprises an encoder encoding the query signal transmitted by the reader controller, a modulator modulating the encoded query signal, and an emission unit converting the modulated query signal into a visible ray signal.

6. The backscattering type RFID communication system of claim 5, wherein the modulator of the visible ray transmitting unit modulates a signal by using amplitude shift keying (ASK).

7. The backscattering type RFID communication system of claim 6, wherein the modulator of the visible ray transmitting unit modulates a signal by using on/off keying (OOK) with a modulation index of 100%.

8. The backscattering type RFID communication system of claim 1, wherein the visible ray receiving unit of the RFID tag comprises a light receiving unit receiving the query signal in a form of visible rays and converting the query signal into an electrical signal, a demodulator demodulating the query signal transmitted from the light receiving unit, and a decoder decoding the demodulated query signal and transmitting the query signal to the tag controller.

9. The backscattering type RFID communication system of claim 1, wherein the tag transmitter of the RFID tag comprises an encoder encoding the response signal transmitted by the tag controller and a backscattering unit converting the response signal transmitted from the encoder into a carrier signal that is resonant to the carrier wave.

10. The backscattering type RFID communication system of claim 1, wherein the reader receiver of the RFID reader generates a signal having a reverse phase to a phase of the non-modulated carrier wave and having the same magnitude as a magnitude of the non-modulated carrier wave flowing through the reader receiver and adds the signal to the reader receiver, thereby removing the non-modulated carrier wave flowing through the reader receiver.

* * * * *